(No Model.)

W. G. BROWNE.
TACK PULLER.

No. 549,895. Patented Nov. 19, 1895.

Witnesses
J. H. Shumway
Geo. E. Hall

William G. Browne,
Inventor
By Atty.
Earle Seymour

UNITED STATES PATENT OFFICE.

WILLIAM G. BROWNE, OF MERIDEN, CONNECTICUT, ASSIGNOR TO THE BROWNE & DOWD MANUFACTURING COMPANY, OF SAME PLACE.

TACK-PULLER.

SPECIFICATION forming part of Letters Patent No. 549,895, dated November 19, 1895.

Application filed September 25, 1894. Serial No. 524,079. (No model.)

*To all whom it may concern:*

Be it known that I, WILLIAM G. BROWNE, of Meriden, in the county of New Haven and State of Connecticut, have invented a new Improvement in Tack-Pullers; and I do hereby declare the following, when taken in connection with the accompanying drawings and the letters of reference marked thereon, to be a full, clear, and exact description of the same, and which said drawings constitute part of this specification, and represent, in—

Figure 1:
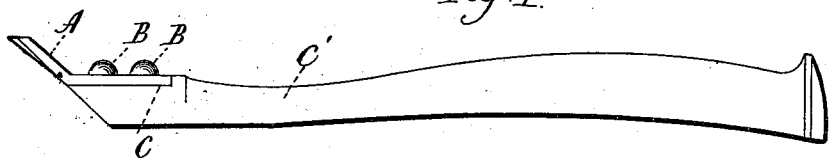
Figure 2:
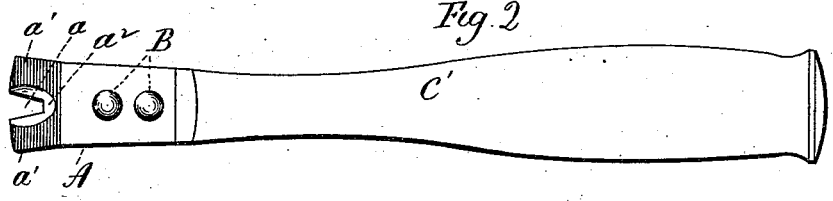
Figure 3:
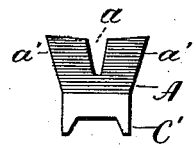
Figure 4:
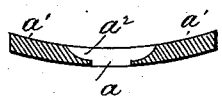

Figure 1, a view in side elevation of a tack-puller constructed in accordance with my invention; Fig. 2, a plan view thereof; Fig. 3, and end view thereof looking toward the claw; Fig. 4, an enlarged view in transverse section through the projecting end of the claw.

My invention relates to an improvement in tack-pullers, the object being to provide at a low cost for manufacture a simple, convenient, and durable device constructed with particular reference to convenient and effective operation.

With these ends in view my invention consists in a tack-puller having certain details of construction and combinations of parts, as will be hereinafter described, and pointed out in the claim.

In carrying out my invention I employ a sheet-steel claw A, which is secured by rivets B B or in some other equivalent manner in a recess C, formed in the upper surface of the inner end of the cast-metal handle C', which may be of any convenient form. The outer end of the claw projects considerably beyond the extreme inner end of the handle and is bent upward and transversely bowed, as clearly shown in Fig. 2 of the drawings. The said end of the claw is constructed with a central V-shaped notch $a$, dividing the claw into two prongs $a'$ $a'$, the upper surfaces of which are beveled, so as to adapt the prongs to readily slide under the head of the tack. The upper surface of the said end of the claw is also recessed, as at $a^2$, at points adjacent to the notch, so as to receive the head of the tack. By bowing the end of the claw transversely the friction attending its use is reduced to the minimum, inasmuch as when the claw is pushed under the tack it rides upon the inner ends of the two prongs instead of upon its whole face.

I would further call attention to the fact that I bevel the extreme inner end of the handle, as at $c$, in conformity with the inclination of the projecting end of the claw, the said bevel coacting with the said end of the claw to secure the long leverage required for the easy drawing of the tacks and to prevent bending the same.

The claw, it will be understood, is blanked out of sheet-steel and struck up and finished, after which it is applied to the handle. Under this construction the device is as durable and effective as though it were made entirely of steel, and much superior to a tack-puller made throughout of cast metal, which cannot be made thin enough to slide readily under the head of the tack without being too frail for use.

I am aware that a device for pulling spikes has had a hard claw applied to a metal handle, and I do not claim that construction broadly.

Having fully described my invention, what I claim as new, and desire to secure by Letters Patent, is—

The herein described tack puller, consisting of a cast-metal handle, having its inner end constructed upon its upper face with a recess and upon its lower face with a bevel, and of a hardened claw set into the said recess and rigidly secured to the handle and projecting beyond the same, its said projecting end being bent to conform to the pitch of the said bevel, and struck in a transversely bowed form and centrally notched, and milled about the notch and also sharpened, substantially as set forth.

In testimony whereof I have signed this specification in the presence of two subscribing witnesses.

WILLIAM G. BROWNE.

Witnesses:
E. A. MERRIMAN,
WILLIS I. LEWIS.